(12) United States Patent
Fu et al.

(10) Patent No.: US 12,452,528 B2
(45) Date of Patent: Oct. 21, 2025

(54) IMAGE SIGNAL PROCESSING DRIVING METHOD, CONTROL MODULE, PROCESSING MODULE AND MEDIUM

(71) Applicants: VERISILICON MICROELECTRONICS (SHANGHAI) CO., LTD., Shanghai (CN); VERISILICON MICROELECTRONICS (CHENGDU) CO., LTD., Sichuan (CN); VERISILICON MICROELECTRONICS (NANJING) CO., LTD., Jiangsu (CN)

(72) Inventors: Yinsheng Fu, Shanghai (CN); Xia Zhong, Shanghai (CN); Xianfeng Tang, Shanghai (CN); Chao Liang, Shanghai (CN); Hongling Men, Shanghai (CN)

(73) Assignees: VERISILICON MICROELECTRONICS (SHANGHAI) CO., LTD., Shanghai (CN); VERISILICON MICROELECTRONICS (CHENGDU) CO., LTD., Chengdu (CN); VERISILICON MICROELECTRONICS (NANJING) CO., LTD., Nanjing (CN)

( * ) Notice: Subject to any disclaimer, the term of this patent is extended or adjusted under 35 U.S.C. 154(b) by 0 days.

(21) Appl. No.: 18/284,500

(22) PCT Filed: Nov. 24, 2022

(86) PCT No.: PCT/CN2022/134118
§ 371 (c)(1),
(2) Date: Sep. 27, 2023

(87) PCT Pub. No.: WO2024/108499
PCT Pub. Date: May 30, 2024

(65) Prior Publication Data
US 2025/0280192 A1 Sep. 4, 2025

(51) Int. Cl.
*H04N 23/60* (2023.01)
(52) U.S. Cl.
CPC .................................. *H04N 23/64* (2023.01)
(58) Field of Classification Search
CPC .......... H04N 23/60; H04N 23/80; H04N 5/77; H04N 5/772; H04N 21/262; H04N 21/26291
(Continued)

(56) References Cited

U.S. PATENT DOCUMENTS 12,126,915 B2 * 10/2024 An ........................ H04N 23/60
2024/0004716 A1 * 1/2024 Creed ................... G06F 9/3851

* cited by examiner

*Primary Examiner* — Yogesh K Aggarwal
(74) *Attorney, Agent, or Firm* — Kilpatrick Townsend & Stockton LLP (57) ABSTRACT

Provided are image signal processing driving method, control module, processing module and medium, being applied to an image signal processing module including a plurality of ISP cores or an ISP core supporting time division multiplexing. The image signal processing module is equipped with driver architecture. The method includes: receiving, by the interface layer, image signal processing (ISP) instruction sent by upper application, wherein the ISP instruction carries initial control parameters and image size parameters; determining, by the connection layer, processing mode of image signals according to the image size parameters, and determining target control parameters according to the initial control parameters for different processing modes, wherein the processing modes include single-core mode or multi-core mode; and sending, by the driver layer, the target control parameters to target ISP core, so as to drive the target (Continued)

ISP core to perform image signal processing according to the target control parameters.

16 Claims, 4 Drawing Sheets

(58) Field of Classification Search
USPC .................................................... 348/222.1
See application file for complete search history.

IMAGE SIGNAL PROCESSING DRIVING METHOD, CONTROL MODULE, PROCESSING MODULE AND MEDIUM

TECHNICAL FIELD

The present disclosure relates to the technical field of image processing, in particular to an image signal processing driving method (i.e., an image signal processor driving method), a control module, a processing module and a medium.

BACKGROUND ART

ISP (image signal processor) technology is a technology to improve the image quality of image signals. With the rapid development of electronic devices, the picture resolution has gradually increased from 2K to 4K, 8K, 16K, etc. At the same time, people's requirements for picture resolution have gradually increased. In the related technologies, resolution of 8K and above needs to be implemented by multiple cores. It is an urgent technical problem to be solved in the art that electronic devices needs to meet the realization of low resolution while meeting the realization of the resolution of 8K and above.

SUMMARY

Embodiments of the present disclosure aims to provide an image signal processing driving method, a control module, a processing module and a medium, so as to realize the technical effect of simultaneously meeting the realization of high resolution and low resolution.

A first aspect of the embodiments of the present disclosure provides an image signal processing driving method, which is configured for being applied to an image signal processing module including a plurality of ISP cores or an ISP core supporting time division multiplexing, wherein the image signal processing module is equipped with a driver architecture, the driver architecture includes an interface layer, a connection layer and a driver layer, and the driver layer is connected to the ISP core(s). The method includes:

receiving, by the interface layer, an image signal processing (ISP) instruction sent by an upper application, wherein the ISP instruction carries initial control parameters and image size parameters;

determining, by the connection layer, a processing mode of image signals according to the image size parameters, and determining target control parameters according to the initial control parameters for different processing modes, wherein the processing modes include a single-core mode or a multi-core mode; and sending, by the driver layer, the target control parameters to a target ISP core, so as to drive the target ISP core to perform image signal processing according to the target control parameters.

In the above implementation process, the image signal processing module includes a plurality of ISP cores or an ISP core supporting time division multiplexing. At the same time, the image signal processing module is equipped with a driver architecture. An ISP instruction issued by an upper application carries initial control parameters and image size parameters. By adding a connection layer to the driver architecture, the connection layer may determine which processing mode to use according to the image size parameters. At the same time, regardless of the processing mode, the connection layer can construct different target control parameters according to the initial control parameters. The driver layer may send the target control parameters to the target ISP core to drive the target ISP core to perform image signal processing. In this way, both the low resolution implemented by a single core and the high resolution implemented by multiple cores can be implemented under the same driver architecture, thus realizing the compatibility of a plurality of processing modes.

Further, the processing mode is the multi-core mode. The determining the target control parameters according to the initial control parameters includes:

constructing a plurality of control parameters as the target control parameters according to the initial control parameters.

In the above implementation process, the connection layer constructs a plurality of control parameters as target control parameters in the multi-core mode, thus realizing the technical effect of being compatible with a plurality of processing modes at the same time.

Further, the ISP instruction includes the called target function. The constructing a plurality of control parameters as the target control parameters according to the initial control parameters includes:

calling a member function pointed by a function pointer bound to the multi-core mode to construct the initial control parameters into a plurality of control parameters as the target control parameters, wherein the member function corresponds to the target function.

In the above implementation process, the function pointer may point to different member functions. In the multi-core mode, the member function corresponding to the target function pointed by the corresponding function pointer may be called to construct the plurality of control parameters. In this way, the needed target control parameters can be constructed in different processing modes, so that the target ISP core(s) can perform image signal processing according to the corresponding target control parameters in different processing modes, thus realizing the technical effect of being compatible with a plurality of processing modes at the same time.

Further, the target function includes one or more of a functional module opening function, a functional module closing function and a driver interface function.

In the above implementation process, different target functions included in an ISP instruction can construct corresponding target control parameters by calling the corresponding member functions pointed by the function pointes in different processing modes. In this way, the target ISP core can perform image signal processing according to the corresponding target control parameters in different processing modes, thus realizing the technical effect of being compatible with a plurality of processing modes at the same time.

Further, the ISP instruction indicates a target image processing function to be implemented; the target control parameters include control parameters of size type, the control parameters of size type include one or more of image width, parameters related to image width, image height, and parameters related to image height; the target ISP core performs image signal processing to implement the target image processing function; and the constructing a plurality of control parameters as the target control parameters according to the initial control parameters includes:

if the target image processing function is a preset function, constructing a plurality of different control parameters as the target control parameters, wherein the preset function is implemented by performing image signal processing in the target ISP core according to the control parameters of size type; and if the target image processing function is not the preset function, constructing a plurality of same control parameters as the target control parameters.

In the above implementation process, the target control parameters constructed in the multi-core mode are different for different image processing functions. For the preset function, the target control parameters on which it is based to be implemented are control parameters of size type, so the plurality of control parameters constructed are different, so that different control parameters can be used for image signal processing. However, for image processing functions other than the preset function, the plurality of control parameters constructed are the same, so that the same control parameters can be used for image signal processing. Therefore, different image processing functions can be implemented in the multi-core mode.

Further, the constructing a plurality of different control parameters includes:

calculating according to a preset image position to obtain a plurality of different control parameters as the target control parameters.

In the above realization process, when a plurality of different control parameters need to be obtained, the calculation is performed according to the preset image position, so that the target ISP core can perform image signal processing according to the different control parameters to implement the target image processing function.

Further, in the multi-core mode, the method further includes:

in response to having received all interrupt signals of the image signal processing corresponding to the target ISP core, synchronizing, merging and sending, by the connection layer, the all interrupt signals to the interface layer.

In the above implementation process, when the image signal processing is interrupted, the interrupt signals are synchronized, merged and reported after all the interrupt signals are received. In either mode, the upper application only receives the interrupt signal once, so that the upper application will not perceive the existence of two processing modes.

Further, the method further includes:

after receiving interrupt signals corresponding to the target ISP core, storing the interrupt signals in a corresponding queue; and the in response to having received all interrupt signals of the image signal processing corresponding to the target ISP core, synchronizing, merging and sending the all interrupt signals to the interface layer includes:

when interrupt signals are stored in all queues, reading the interrupt signals in each queue, then synchronizing, merging and sending to the interface layer.

In the above implementation process, after receiving the interrupt signal of the target ISP core, the interrupt signal is stored in the corresponding queue to wait for all the interrupt signals. By setting the queue for storing interrupt signals, the technical effect of waiting for all interrupt signals before synchronizing, merging and reporting can be realized.

Further, if there are a plurality of target ISP cores, the all interrupt signals include interrupt signals corresponding to all the target ISP cores, and the corresponding queue is a queue corresponding to a target ISP core sending the interrupt signals; and if the target ISP core supports time division multiplexing, all interrupt signals include interrupt signals sent by the target ISP core in all multiplexing time periods, and the corresponding queue is a queue corresponding to a multiplexing time period where the interrupt signals are sent.

In the above implementation process, a corresponding queue is set for each target ISP core, or a corresponding queue is set for each multiplexing time period. By storing the interrupt signal corresponding to the target ISP core in the corresponding queue, the technical effect of waiting for all interrupt signals before synchronizing, merging and reporting can be realized.

Further, the interrupt signals include a plurality of types, and the storing the interrupt signals in a corresponding queue includes:

according to a target type to which the interrupt signals belong, storing the interrupt signals in a target position corresponding to the target type in the queue; and all the queues storing the interrupt signals includes that:

the interrupt signals are stored in the target positions of all the queues.

In the above implementation process, because the interrupt signals include a plurality of types, the interrupt signals of the same type are synchronized, merged and reported. Therefore, by setting different positions in the queue to correspond to different types of interrupt signals, different types of interrupt signals can be stored in the same queue. When all queues have interrupt signals stored in the same position, it is considered that all interrupt signals have been received. Thus, the technical effect of waiting for all interrupt signals before synchronizing, merging and reporting can be realized.

Further, the processing mode is the single-core mode.

The determining target control parameters according to the initial control parameters includes:

determining the initial control parameters to be the target control parameters.

In the above implementation process, the connection layer directly determines the initial control parameters to be the target control parameters in the single-core mode, thus realizing the technical effect of being compatible with a plurality of processing modes at the same time.

A second aspect of the embodiments of the present disclosure provides an image processing control module, the image processing control module is configured for being connected to a plurality of ISP cores or an ISP core supporting time division multiplexing, and the image processing control module is configured for implementing the steps of any one of the methods described in the first aspect.

A third aspect of the embodiments of the present disclosure provides an image signal processing module, which includes the image processing control module as described in the second aspect, and a plurality of ISP cores or an ISP core supporting time division multiplexing, wherein the image processing control module is connected to the plurality of ISP cores or the ISP core supporting time division multiplexing.

Further, the image signal processing module is an IP core, a chip or an electronic device configured for image signal processing.

A fourth aspect of the embodiments of the present disclosure provides a computer-readable storage medium storing computer instructions, wherein the computer instructions, when executed by a processor, implement the steps of any one of the methods described in the first aspect.

BRIEF DESCRIPTION OF DRAWINGS

In order to illustrate the technical solutions of the embodiments of the present disclosure more clearly, the accompanying drawings that need to be used in the embodiments of the present disclosure will be briefly introduced. It is to be understood that the accompanying drawings only show some embodiments of the present disclosure, so they shall not be regarded as limiting the scope. For those ordinarily skilled in the art, other relevant drawings may be obtained according to these drawings without creative efforts.

DETAILED DESCRIPTION OF EMBODIMENTS

The technical solutions in the embodiments of the present disclosure will be described below with reference to the accompanying drawings of the embodiments of the present disclosure.

It should be noted that similar reference numerals and letters indicate similar items in the accompanying drawings, so once a certain item is defined in one drawing, it does not need to be further defined and described in subsequent drawings. Meanwhile, in the description of the present disclosure, the terms "first" and "second" are only intended to distinguish descriptions, and shall not be understood as indicating or implying relative importance.

ISP (image signal processor) technology is a technology to improve the imaging quality of image signals. With the rapid development of electronic devices, the picture resolution has gradually increased from 2K to 4K, 8K, 16K, etc. At the same time, people's requirements for picture resolution have gradually increased. In the related technologies, low-resolution images, such as images of 2K, 4K and below, are implemented by a single core. That is, a single ISP core can be used to process low-resolution images. The resolution of 8K and above needs to be implemented by multiple cores. In other words, only by using a plurality of ISP cores, such as two or more ISP cores, can high-resolution image processing be implemented.

Figure 1:
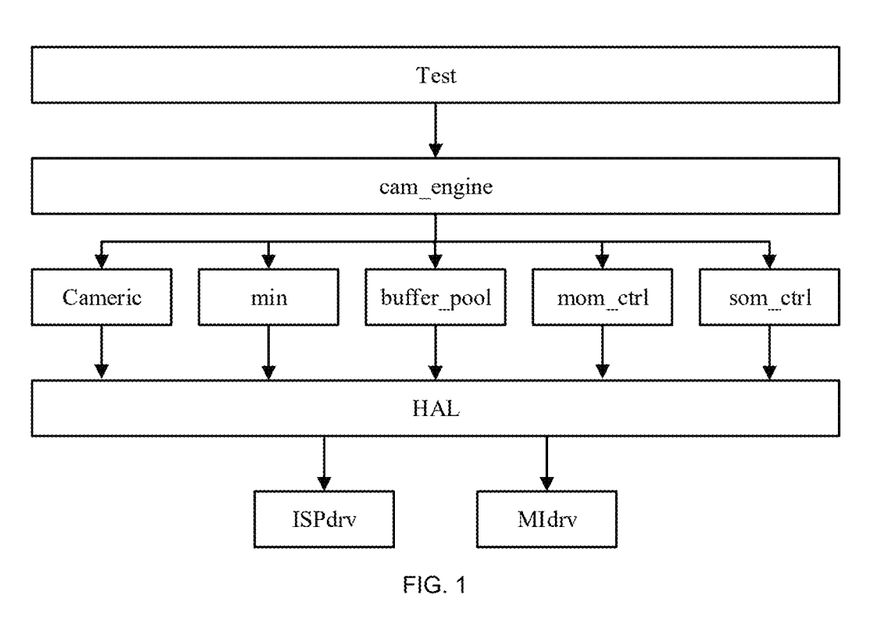
FIG. 1 is a structural schematic diagram of a single-core based driver architecture in the related technologies.

For electronic devices, low-resolution images need to be processed in some scenes, and high-resolution images need to be processed in other scenes. Therefore, electronic devices needs to meet both high-resolution image processing and low-resolution image processing. However, in the related technologies, the driver architecture of ISP is based on a single core to write the drivers. The single-core based ISP driver architecture as shown in FIG. 1 includes test application layer (Test), image engine layer (cam_engine), interface layer (Cameric), memory input manager (mim), buffer cache (buffer_pool), memory output manager control (mom_ctrl), snapshot output module control (som_ctrl), hardware abstraction layer (HAL), ISP driver (ISPdrv) and memory interface driver (MIdrv). This driver architecture can only drive a single core for image signal processing and implement low-resolution image processing.

In order to implement high-resolution image processing, it is necessary to upgrade the driver architecture, so that a plurality of ISP cores can be driven by the driver architecture for image signal processing. At the same time, considering that the electronic devices need to meet both high-resolution image processing and low-resolution image processing, the upgraded driver architecture not only needs to implement multi-core driving, but also needs to maintain the original single-core driving function.

Therefore, the present disclosure provides an image signal processing driving method, which is configured for being applied to an image signal processing module including a plurality of ISP cores or an ISP core supporting time division multiplexing.

The ISP core supporting time division multiplexing means that one identical ISP core executes different tasks in different time periods to achieve the purpose of multi-task execution, and at the same time, it makes full use of the computing resources of the ISP cores. A plurality of multiplexing time periods may appear alternately according to a preset period.

Exemplarily, the image signal processing module is a hardware module, which may include, but is not limited to, an IP (intellectual property) core, a chip, an electronic device, and other hardware devices or hardware modules including ISP cores and configured for image signal processing. The IP core refers to an IP core of an integrated circuit, which is a reusable module with a specific circuit function that has been designed and verified. According to the degree of integration with a specific integrated circuit manufacturing process (Foundry), the IP core may be divided into soft core, solid core and hard core, wherein the soft core does not depend on the final implementation process. Electronic devices may include, but are not limited to, smart phones/mobile phones, personal digital assistants (PDA), media content players, video game stations/systems, virtual reality systems, augmented reality systems, wearable devices (such as watches, bands, gloves, hats, helmets, virtual reality headphones, augmented reality headphones, head mounted devices (HMD), headbands, pendants, armbands, leg rings, shoes or vests, etc.) and other devices that need image processing.

Figure 2:
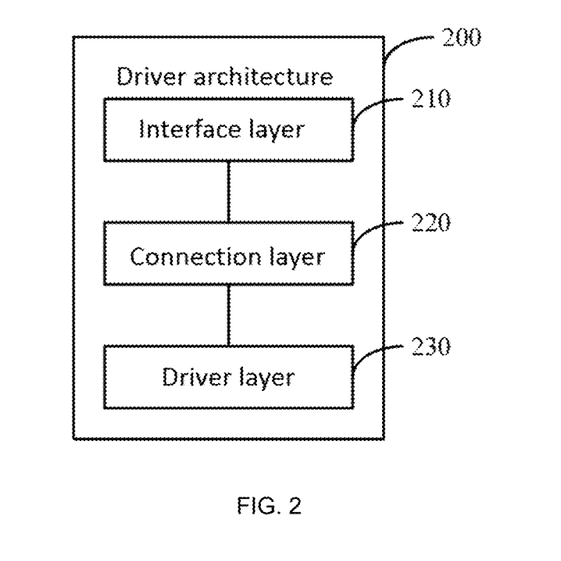
FIG. 2 is a structural block diagram of a driver architecture provided by an embodiment of the present disclosure.

The image signal processing module is equipped with a driver architecture 200 as shown in FIG. 2, which includes an interface layer 210, a connection layer 220 and a driver layer 230. The driver layer 230 is connected to the ISP core(s). If the image signal processing module includes a plurality of ISP cores, the driver layer 230 is connected to the plurality of ISP cores.

Figure 3:
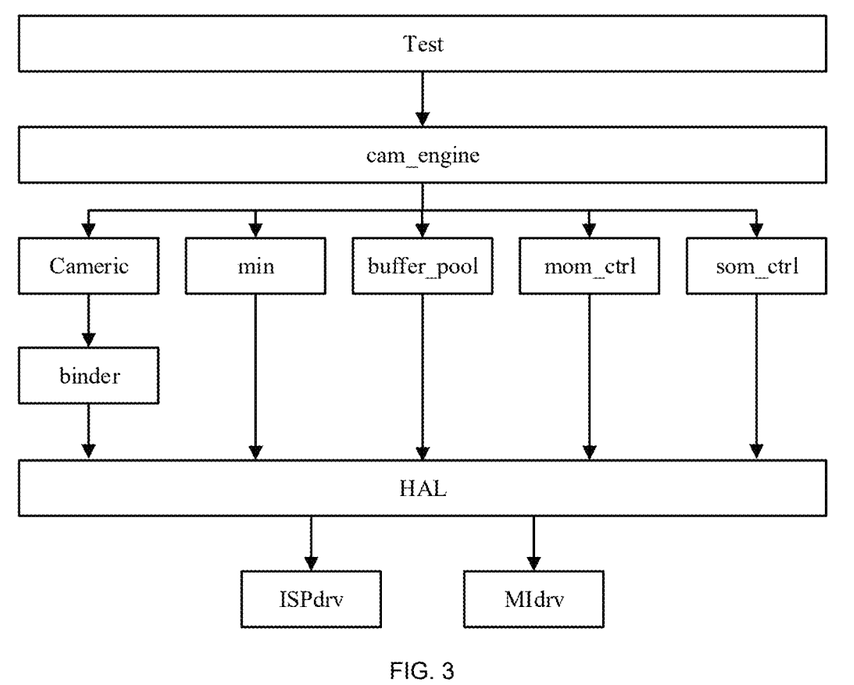
FIG. 3 is a structural schematic diagram of another driver architecture provided by an embodiment of the present disclosure.

Exemplarily, the driver layer 230 includes HAL layer, ISPdrv, and MIdrv as shown in FIG. 1. In addition, the driver architecture 200 may further include other layers for driving the ISP cores, such as test application layer, image engine layer, etc. As an example, FIG. 3 shows an improved driver architecture based on a single-core based ISP driver architecture. As shown in FIG. 3, the driver architecture adds one connection layer (binder) between the interface layer (Cameric) and the hardware abstraction layer (HAL), and the improved driver architecture is compatible with high-resolution image processing and low-resolution image processing. In this way, through the addition of the connection layer, the driver architecture originally configured for driving a single core can also be configured for driving multiple cores for image signal processing. Moreover, the improved driver architecture can be compatible with high-resolution image processing and low-resolution image processing, and at the same time, the original driver architecture has little change, thus saving the human resource cost of development and upgrading.

Figure 4:
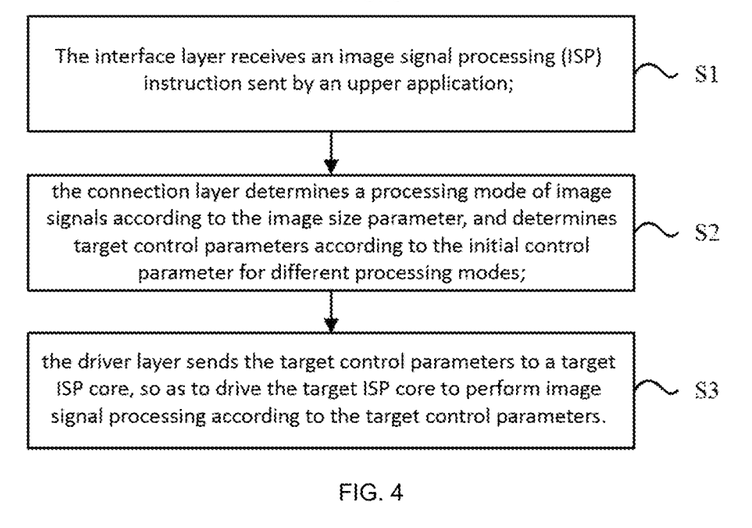
FIG. 4 is a flowchart of an image signal processing driving method provided by an embodiment of the present disclosure.

Based on the above embodiment, an image signal processing driving method provided by the present disclosure is implemented based on the driver architecture shown in FIG. 2 or FIG. 3, and includes the steps shown in FIG. 4:

Step S1: receiving, by the interface layer, an image signal processing (ISP) instruction sent by an upper application,
wherein the ISP instruction carries initial control parameters and image size parameters;

Step S2: determining, by the connection layer, a processing mode of image signals according to the image size parameters, and determining target control parameters according to the initial control parameters for different processing modes,
wherein the processing modes include single-core mode or multi-core mode; and Step S3: sending, by the driver layer, the target control parameters to a target ISP core, so as to drive the target ISP core to perform image signal processing according to the target control parameters.

Exemplarily, the above method steps may be implemented by a dedicated hardware-based device or module that implements a specified function or performs a specified action, and for example, the above method steps may be implemented by an image processing control module. The image processing control module is a hardware module, including a circuit, etc. for implementing a specific function. The image processing control module is connected to a plurality of ISP cores or an ISP core supporting time division multiplexing, and the connected target ISP cores are driven to perform image signal processing by executing the above steps S1 to S3. For example, the image processing control module may be an IP core. Optionally, the image signal processing module may include the above image processing control module, and a plurality of ISP cores or an ISP core supporting time division multiplexing.

The upper application may issue an ISP instruction to make the ISP cores perform image signal processing. The ISP instruction carries initial control parameters and image size parameters. The connection layer may determine the processing mode of the image signal according to the image size parameters, so that the processing mode can be determined at the time of startup.

The processing modes include a single-core mode or a multi-core mode. The single-core mode refers to the image signal processing using one ISP core of the image signal processing module. If the image signal processing module includes a plurality of ISP cores, one of the plurality of ISP cores is configured for image signal processing. The multi-core mode refers to the image signal processing by using at least two ISP cores of the image signal processing module, or executing different tasks related to image signal processing in different multiplexing time periods through ISP to complete image signal processing. For example, if the image signal processing module is a dual-core module, two ISP cores are used for image signal processing in the multi-core mode, so the multi-core mode is also referred to as dual-core mode. For another example, if there are more than two ISP cores in the image signal processing module, the multi-core mode may use all ISP cores for image signal processing, or at least two ISP cores for image signal processing.

The connection layer may determine the processing mode of the image signal through the image size parameters. Exemplarily, if the image size parameters is not less than a preset size threshold, the processing mode is determined to be the multi-core mode; and if the image size parameters is less than the preset size threshold, the processing mode is determined to be the single-core mode. The image size parameters may be the resolution of image. Then it may be set that if the image resolution is not less than 8K, the processing mode is determined to be the multi-core mode; and if the image resolution is less than 8K, the processing mode is determined to be the single-core mode.

Then the connection layer may determine the target control parameters according to the initial control parameters for different processing modes. The determined target control parameters are different in different processing modes. The control parameters refer to the parameters configured in the registers to make the chip effective. The control parameters may be called by users and configured according to their actual needs. The control parameters include a plurality of types, including but not limited to control parameters of size type and control parameters of functional module type. Exemplarily, the control parameters of size type include image width, parameters related to image width, image height, and parameters related to image height. The control parameters of functional module type include CAC (chromatic aberration correction) module parameters and DPF (de-noising pre-filter) module parameters, etc. The initial control parameters and the target control parameters are control parameters of the same type.

After determining the target control parameters, the driver layer may send the target control parameters to the target ISP core. The target ISP core refers to the ISP core for image signal processing.

For an image signal processing module including a plurality of ISP cores, all ISP cores in the image signal processing module may be target ISP cores, that is, all ISP cores participate in image signal processing; or some ISP cores may be the target ISP cores, that is, only some ISP cores participate in image signal processing. For the image signal processing module including the ISP core supporting time division multiplexing, the target ISP core refers to the ISP core supporting time division multiplexing in the image signal processing module and configured for image signal processing. The way to determine the target ISP core will be discussed below, and will not be described here.

According to the image signal processing driving method provided by the present disclosure, by adding the connection layer into the driver architecture, regardless of the processing mode, the connection layer can construct the target control parameters according to the initial control parameters. Compared with the related technologies, the addition of connection layer can decouple the interface layer from the driver layer, so that the corresponding target control parameters can be constructed in different processing modes. The driver layer may send the target control parameters to the target ISP core to drive the target ISP core to perform image signal processing. In this way, both the low resolution implemented by a single core and the high resolution implemented by multiple cores can be implemented under the same driver architecture, thus realizing the compatibility of a plurality of processing modes.

Figure 5:
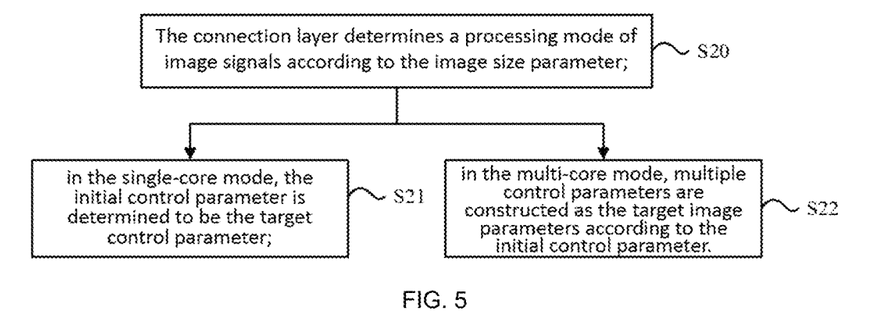
FIG. 5 is a flowchart of another image signal processing driving method provided by an embodiment of the present disclosure.

In some embodiments, step S2 may include the steps shown in FIG. 5:

Step S20: determining, by the connection layer, a processing mode of image signals according to the image size parameters;

Step S21: in the single-core mode, determining the initial control parameters to be the target control parameters;

Step S22: in the multi-core mode, constructing a plurality of control parameters as the target control parameters according to the initial control parameters.

In the single-core mode, the initial control parameters are directly determined to be the target control parameters. The number of one kind of target control parameters is one and the number of the target ISP core is one. In this way, the driver layer can send one initial control parameter as the target control parameters to one target ISP core, so that the target ISP core can perform image signal processing according to the target control parameters.

In the multi-core mode, the target control parameters include a plurality of control parameters, and there are a plurality of target ISP cores or target ISP core multiplexing time periods. The number of one kind of control parameters is the same as the number of target ISP cores or the number of multiplexing time periods. In this way, the driver layer can send a plurality of control parameters to a plurality of target ISP cores respectively, so that the target ISP cores can perform image signal processing according to their respective control parameters. Alternatively, the target ISP core performs image signal processing according to different control parameters in different multiplexing time periods.

In this way, the connection layer constructs different numbers of control parameters as target control parameters in different processing modes, thus realizing the technical effect of being compatible with a plurality of processing modes at the same time.

In some embodiments, the ISP instruction indicates a target image processing function to be implemented. There are a plurality of image processing functions, including but not limited to demosaic, Gamma correction, auto white balance (AWB), etc. The upper application may make the target ISP core perform image signal processing according to the target control parameters by issuing the corresponding an ISP instruction to implement the image processing function. As mentioned above, the control parameters include control parameters of size type and control parameters of functional module type. If the target control parameters on which the image processing function is based to be implemented is the control parameters of size type, that is, one or more of image width, parameters related to image width, image height and parameters related to image height, the image processing function is a preset function. In other words, when implementing the preset function, the target ISP core performs image signal processing according to the control parameters of size type.

It can be understood that in the multi-core mode, each image is processed by a plurality of target ISP cores at the same time or a target ISP core in a plurality of multiplexing time periods, so as to implement the corresponding image processing function. Taking AWB as an example, each image may be divided into a plurality of sub-images, and the number of the sub-images may be the same as the number of the target ISP cores, or the number of multiplexing time periods of the target ISP core. In this way, each target ISP core performs AWB processing on one sub-image, or performs AWB processing on one sub-image in each multiplexing time period of the target ISP core. In AWB processing, the target ISP core performs image signal processing corresponding to the AWB algorithm according to the control parameters of size type. Therefore, AWB is the preset function mentioned above. After the image signal processing is completed, the image processing results of each target ISP core or each multiplexing time period of the target ISP core may be stored in sequential addresses, and there will be no overlap area due to uneven image segmentation, so as to obtain an image after image processing.

As an example, the preset function may include, but not limited to, LSC (lens shading correction), CAC (chromatic aberration correction), AE (auto exposure), AWB, DPCC (defect pixel cluster correction), IS (image stabilization), Crop, Scale, VSM (video stabilization measurement), PDAF (phase detection auto focus), etc. Image functions that do not need the control parameters of size type image signal processing on which it is based to be implemented, that is, image processing functions other than the preset function include but are not limited to 2DNR (2D digital noise reduction), 3DNR (3D digital noise reduction), EE (edge enhance), DPF (de-noising pre-filter), CCM (color correction matrix), CSM (color space matrix), WDR (wide dynamic range), BLS (black level subtraction) and DGAIN (digital gain), etc.

Figure 6:
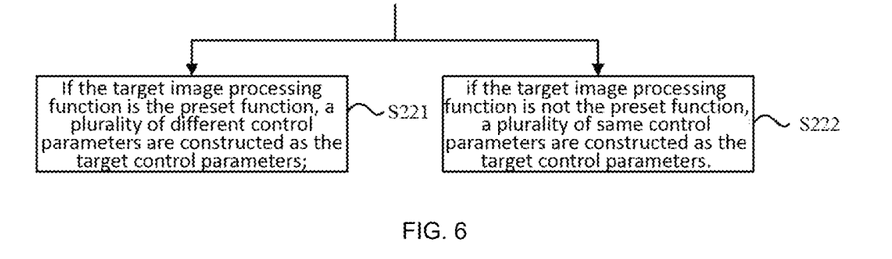
FIG. 6 is a flowchart of another image signal processing driving method provided by an embodiment of the present disclosure.

The target image processing function indicated by the ISP instruction may be the preset function mentioned above or may not be a preset function. In this way, in the above step S22, the constructing a plurality of control parameters in the multi-core mode may include the steps shown in FIG. 6:

Step S221: if the target image processing function is a preset function, constructing a plurality of different control parameters as the target control parameters; and Step S222: if the target image processing function is not the preset function, constructing a plurality of same control parameters as the target control parameters.

Exemplarily, in the above step S221, the constructing a plurality of different control parameters may include: calculating according to a preset image position to obtain a plurality of different control parameters as the target control parameters.

As mentioned above, for the preset function, the image is usually divided into a plurality of sub-images, and then the image signal processing is performed on different sub-images according to different control parameters. When constructing different control parameters, the corresponding control parameters may be obtained by calculating according to the image position of the sub-image in the image. Because the image position of each sub-image in the image is different, the constructed control parameters are also different. The sub-image is divided according to the preset division mode, so the image position is preset. As an example, a number of different control parameters may be obtained by performing image algorithm calculation according to the image position. The image algorithm include a mapping algorithm. After the initial control parameters are processed by the mapping algorithm, a plurality of different control parameters may be obtained as the target control parameters.

Exemplarily, in the above step S222, the constructing a plurality of same control parameters may include performing image algorithm calculation to obtain a plurality of different control parameters.

When constructing a plurality of same control parameters, the image algorithm calculation may be directly performed without considering the image position of the sub-image, to obtain the plurality of same control parameters.

In this embodiment, the construction process of a plurality of control parameters is different for different target image processing functions in the multi-core mode. For the preset function, since the target control parameters on which it is based to be implemented are the control parameters of size type, it is necessary to construct two different control parameters of size type as the target control parameters through the mapping algorithm. The target ISP core also performs image signal processing according to the different control parameters of size type. The image processing functions other than the preset function do not need to be based on the control parameters of size type to be implemented, so a plurality of control parameters are the same, and there is no need to process the mapping algorithm. The target ISP core performs image signal processing according to the same control parameters.

In some embodiments, the ISP instruction includes the called target function. The target function may include, but is not limited to, one or more of a functional module opening function (Open function), a functional module closing function (Close function), and a driver interface (ioctl) function. The Open function is configured for opening the functional module and the Close function is configured for closing the functional module. The functional modules related to the image processing function are called by the ioctl function. The above target function may be an API (application programming interface) function, which is configured for calling the API in the driver layer. Exemplarily, the driver layer includes a hardware abstraction layer, an ISPdrv and a MIdrv, and the target function may be configured for calling an API in the hardware abstraction layer.

The multi-core mode is bound to a function pointer. The function pointer refers to a pointer variable of a function, which may point to its member function to call the member function. In this way, the constructing a plurality of control parameters in the multi-core mode in the above step S22 may include calling the member function pointed by the function pointer bound to the multi-core mode to construct the initial control parameters into a plurality of control parameters as target control parameters. The member function corresponds to the target function.

Figure 7:
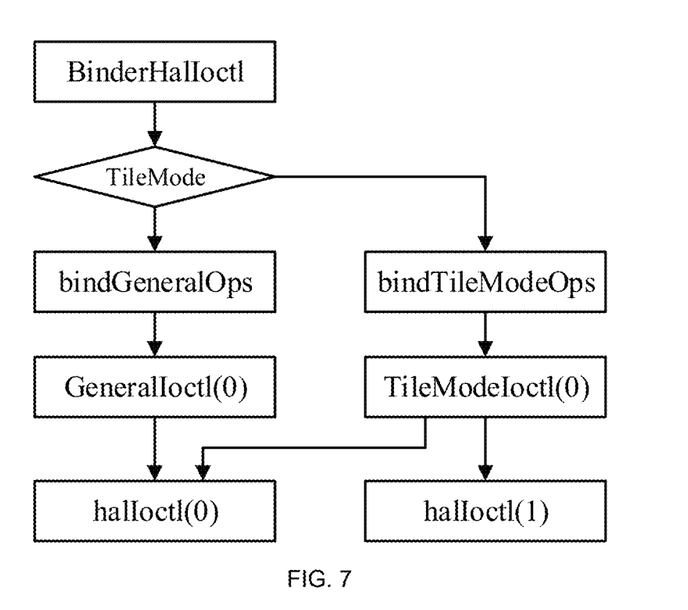
FIG. 7 is a flowchart of target control parameters construction process provided by an embodiment of the present disclosure.

A dual-core device is taken as an example, that is, the multi-core mode is dual-core mode. As shown in FIG. 7, if the target function is an Ioctl function, that is, the control parameters need to be passed, the driver layer is provided with an API for implementing the image processing module, that is, API BinderHalIoctl. An upper layer, such as the interface layer, may call API BinderHalIoctl. Then, if the processing mode is determined to be the single-core mode, the member function GeneralIoctl(0) pointed by the function pointer bindGeneralOps is called, and the member function GeneralIoctl(0) corresponds to the target function (Ioctl function). Then, the initial control parameters are passed to the halIoctl(0) function of the driver layer as the target control parameters. If the processing mode is determined to be a dual-core mode (TileMode), the member function TileModeIoctl(0) pointed by the function pointer bindTileModeOps bound to the multi-core mode is called, so as to construct the initial control parameters into two control parameters as the target control parameters. The member function TileModeIoctl(0) corresponds to the target function Ioctl. Then, the two control parameters are passed to the halIoctl(0) function and halIoctl(1) function of the driver layer respectively.

Figure 8:
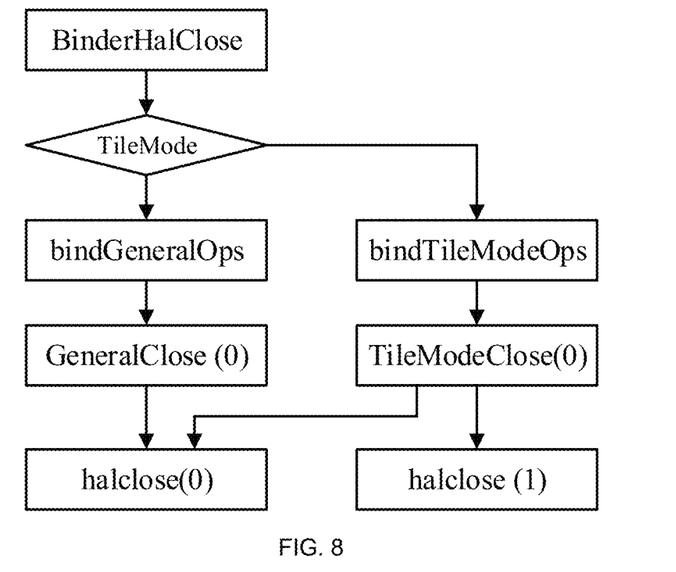
FIG. 8 is a flowchart of another target control parameters construction process provided by an embodiment of the present disclosure.

As shown in FIG. 8, if the target function is the Close function, that is, when the functional module needs to be closed, the driver layer provides an API (namely API BinderHalClose) for closing the functional module. An upper layer, such as the interface layer, may call the API BinderHalClose. Then, if the processing mode is determined to be the single-core mode, the member function GeneralClose(0) pointed by the function pointer bindGeneralOps is called, and the member function GeneralClose(0) corresponds to the target function Close. Then, the initial control parameters are passed to the halclose(0) function of the driver layer as the target control parameters. If the processing mode is determined to be the dual-core mode (TileMode), the member function TileModeClose(0) pointed by the function pointer bindTileModeOps bound to the multi-core mode is called, so that the initial control parameters are constructed into two control parameters as the target control parameters. The member function TileMode(0) corresponds to the target function (Close function). Then, the two control parameters are passed into the halclose(0) function and the halclose(1) function of the driver layer respectively.

In this embodiment, the multi-core mode is bound to a function pointer, which may point to different member functions. In the multi-core mode, the member function corresponding to the target function pointed by the function pointer may be called to construct a plurality of control parameters. In this way, the needed target control parameters can be constructed in different processing modes, so that the target ISP core(s) can perform image signal processing according to the corresponding target control parameters in different processing modes, thus realizing the technical effect of being compatible with a plurality of processing modes at the same time.

In some embodiments, the ISP instruction also carries the ISP core identification number (also referred to as ISP core ID), which is configured for uniquely identifying the ISP core. According to the situation that the image processing control module calls the ISP core identification number, the processing mode of the image signal can also be determined. If the image processing control module only calls one ISP core identification number once, it is determined that the processing mode is single-core mode and the target ISP core corresponds to the ISP core identification number, that is, the target ISP core is the ISP core indicated by the ISP core identification number. If the image processing control module calls a plurality of ISP core identification numbers, it can be determined that the processing mode is the multi-core mode, and there are a plurality of target ISP cores, and the target ISP cores correspond to the plurality of ISP core identification numbers one by one respectively, that is, the ISP cores indicated by the plurality of ISP core identification numbers respectively are the target ISP cores. If the image processing control module calls one ISP core identification number a plurality of times, it can be determined that the processing mode is multi-core mode, and image signal processing is performed by time division multiplexing of the target ISP core in the multi-core mode. The target ISP core is the ISP core indicated by the ISP core identification number.

In this embodiment, the ISP instruction carries the ISP core identification number, so that the connection layer can determine whether the processing mode is single-core mode or multi-core mode according to the situation that the ISP core identification number is called. At the same time, the ISP core indicated by the ISP core identification number can be determined to be the target ISP core for image signal processing, thus realizing the technical effect of being compatible with a plurality of processing modes at the same time.

The target ISP core will generate an interrupt signal after completing the image signal processing. At this point, the target ISP core will send an interrupt signal to the upper layer. In some embodiments, in the multi-core mode, in response to having received all interrupt signals of the image signal processing corresponding to the target ISP core, the connection layer synchronizes, merges and sends all the interrupt signals to the interface layer.

If there are a plurality of target ISP cores, in response to having received the interrupt signals of the image signal processing corresponding to all (at least one) target ISP cores, the connection layer synchronizes, merges and sends all the interrupt signals to the interface layer.

If the target ISP core supports time division multiplexing, in response to having received the interrupt signals of the image signal processing corresponding to all (at least one) multiplexing time periods of the target ISP core, the connection layer synchronizes, merges and sends all the interrupt signals to the interface layer.

Exemplarily, all interrupt signals are merged into one interrupt signal and reported to the interface layer, to inform the interface layer to perform corresponding processing.

Exemplarily, the synchronization of all interrupt signals may be implemented by the interrupt handling function provided by the connection layer. The interface layer may be bound to the interrupt handling function provided by the connection layer.

As mentioned above, for different target image functions, the constructed control parameters may be the same or different. Taking the image width as the control parameters for example, if a plurality of control parameters are the same, a plurality of target ISP cores or a plurality of multiplexing time periods of target ISP cores perform image signal processing on sub-images with the same size (resolution). In this way, the completion time of image signal processing of each sub-image is the same, or the difference between the completion time of image signal processing of each sub-image is within the preset time difference. In this way, the connection layer may receive all interrupt signals at the same time or within a preset time difference.

If a plurality of control parameters are different, a plurality of target ISP cores perform image signal processing on sub-images with different sizes (resolutions). In this way, for different sub-images, image signal processing is completed at different times. In this way, the connection layer will successively receive the interrupt signal corresponding to each target ISP core or the interrupt signal corresponding to each multiplexing time period.

In this way, in order to synchronize all interrupt signals, in some embodiments, the preceding interrupt signal may be stored through a queue. If there are a plurality of target ISP cores, each target ISP core may be provided with a queue, and after receiving an interrupt signal corresponding to a target ISP core, the interrupt signal may be stored in the queue corresponding to the target ISP core. If the target ISP core supports time division multiplexing, a queue may be set for each multiplexing time period. After receiving an interrupt signal corresponding to one certain multiplexing time period, the interrupt signal may be stored in the queue corresponding to the multiplexing time period where the interrupt signal is sent.

When interrupt signals are stored in all queues, it is considered that all interrupt signals have been received, and then the interrupt signals in each queue are read, synchronized, merged and sent to the interface layer.

In some embodiments, the interrupts of image signal processing include a plurality of types, including but not limited to YUV interrupts output by sp1 (self-path 1) and YUV interrupts output by sp2 (self-path 2) in the memory interface (MI), Raw interrupts, and DMA (direct memory access) interrupts of DMA. Different types of interrupts correspond to different interrupt signals, that is, interrupt signals also include a plurality of types. In this way, each type of interrupt signal has a corresponding storage position in the queue. In other words, different positions in the queue are configured for storing different types of interrupt signals.

In this way, after receiving the interrupt signal, the target position in the queue may be determined according to the type of the interrupt signal, and the interrupt signal may be stored in the target position of the queue. When the interrupt signals are stored in the target positions of all queues, it is considered that the interrupt signals of the same type have been received from all target ISP cores or all multiplexing time periods of the target ISP core, and the interrupt signals of the same type in the target positions of each queue are read, synchronized, merged and sent to the interface layer.

Exemplarily, a register of the interface layer may be set.

According to the image signal processing driving method provided by the present disclosure, by adding the connection layer into the driver architecture, regardless of the processing mode, the connection layer can construct different target control parameters according to the initial control parameters. The driver layer may send the target control parameters to the target ISP core to drive the target ISP core to perform image signal processing. In this way, both the low resolution implemented by a single core and the high resolution implemented by multiple cores can be implemented under the same driver architecture, thus realizing the compatibility of a plurality of processing modes.

Based on the image signal processing driving method provided in any one of the above embodiments, the present disclosure further provides a driver architecture, which is equipped in an image signal processing module including a plurality of ISP cores or an ISP core supporting time division multiplexing, and is configured for driving image signal processing. As shown in FIG. 2, the driver architecture 200 includes an interface layer 210, a connection layer 220 and a driver layer 230, and the driver layer 230 is connected to the ISP core(s).

The interface layer 210 is configured for receiving an image signal processing (ISP) instruction sent by an upper application, wherein the ISP instruction carries the initial control parameters and the image size parameters.

The connection layer 220 is configured for determining the processing mode of the image signal according to the image size parameters, and determining the target control parameters according to the initial control parameters for different processing modes, wherein the processing mode includes a single-core mode or a multi-core mode.

The driver layer 230 is configured for sending the target control parameters to the target ISP core to drive the target ISP core to perform image signal processing according to the target control parameters.

In some embodiments, the connection layer 220 is specifically configured for:

in the single-core mode, determining the initial control parameters to be the target control parameters; and in the multi-core mode, constructing a plurality of control parameters as the target control parameters according to the initial control parameters.

In some embodiments, the ISP instruction indicates a target image processing function to be implemented; the target control parameters include control parameters of size type, the control parameters of size type include one or more of image width, parameters related to image width, image height, and parameters related to image height; the target ISP core performs image signal processing to implement the target image processing function; and the connection layer 220 is specifically configured for:

if the target image processing function is a preset function, constructing a plurality of different control parameters as the target control parameters, wherein the preset function is implemented by performing image signal processing in the target ISP core according to the control parameters of size type; and     if the target image processing function is not the preset function, constructing a plurality of same control parameters as the target control parameters.

In some embodiments, the connection layer 220 is specifically configured for:

according to the preset image position, image algorithm calculation is performed to obtain a plurality of different control parameters.

In some embodiments, the ISP instruction includes a called target function. The connection layer 220 is specifically configured for:

calling the member function pointed by the function pointer bound to the multi-core mode to construct a plurality of control parameters as the target control parameters according to the initial control parameters, wherein the member function corresponds to the target function.

In some embodiments, the target function includes one or more of a functional module opening function, a functional module closing function and a driver interface function.

In some embodiments, in the multi-core mode, the connection layer 220 is further configured for:

in response to having received all interrupt signals of the image signal processing corresponding to the target ISP core, synchronizing, merging and sending the all interrupt signals to the interface layer.

In some embodiments, the connection layer 220 is further configured for:

after receiving interrupt signals corresponding to the target ISP core, storing the interrupt signals in a corresponding queue; and when interrupt signals are stored in all queues, reading the interrupt signals in each queue, then synchronizing, merging and sending to the interface layer.

In some embodiments, if there are a plurality of target ISP cores, the all interrupt signals include interrupt signals corresponding to all the target ISP cores, and the corresponding queue is a queue corresponding to a target ISP core sending the interrupt signals; and     if the target ISP core supports time division multiplexing, the all interrupt signals include interrupt signals sent by the target ISP core in all multiplexing time periods, and the corresponding queue is a queue corresponding to a multiplexing time period where the interrupt signals are sent.

In some embodiments, the interrupt signal includes a plurality of types, and the connection layer 220 is specifically configured for storing the interrupt signals in a target position corresponding to the target type in the queue according to a target type to which the interrupt signals belong.

In some embodiments, the image size parameters includes the resolution of image.

The realization process of the functions and effects of each module in the above device is detailed in the realization process of the corresponding steps in the above method, and will not be repeated here.

Based on the image signal processing driving method described in any of the above embodiments, the present disclosure further provides an image processing control module. The image processing control module is a hardware module, including a circuit, etc. for implementing a specific function. The image processing control module is connected to a plurality of ISP cores or an ISP core supporting time division multiplexing, and drives the connected target ISP core(s) to perform image signal processing by executing the image signal processing driving method described in any of the above embodiments.

In some embodiments, the image processing control module may be an IP core.

Figure 9:
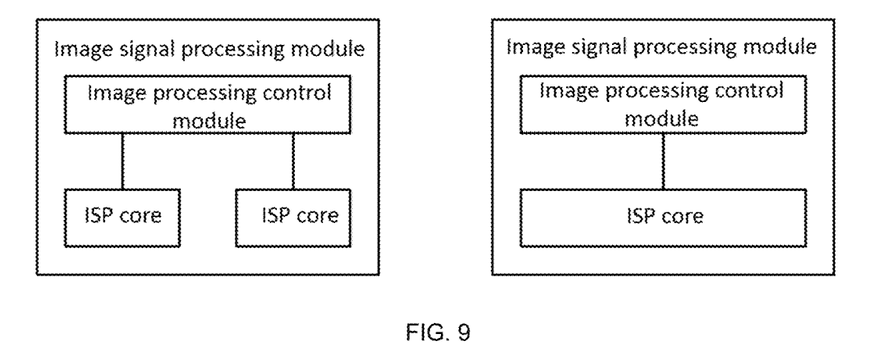
FIG. 9 is a structural schematic diagram of an image signal processing module provided by an embodiment of the present disclosure.

Based on the image signal processing driving method described in any of the above embodiments, the present disclosure further provides a structural schematic diagram of an image signal processing module as shown in FIG. 9. Optionally, as shown in the left figure in FIG. 9, the image signal processing module includes an image processing control module and a plurality of ISP cores. The image processing control module is connected to the plurality of ISP cores. The image processing control module may call the plurality of ISP cores to implement image signal processing in the multi-core mode; or may call one certain ISP core a plurality of times to implement image signal processing in the multi-core mode through time division multiplexing of the called ISP core; or may call one certain ISP core once to implement image signal processing in the single-core mode.

Optionally, as shown in the right figure in FIG. 9, the image signal processing module includes an image processing control module and one ISP core. The image processing control module is connected to an ISP core, and the ISP core supports time division multiplexing. The image processing control module may call the ISP core a plurality of times, and implement image signal processing in the multi-core mode through time division multiplexing of the ISP core; or may call the ISP core once to implement image signal processing in the single-core mode. The image processing control module drives the connected target ISP core to perform image signal processing by executing the image signal processing driving method described in any of the above embodiments.

In some embodiments, the image processing control module and the ISP core may be assembled into an IP core. That is, the image signal processing module may be an IP core. Optionally, the IP core may be further encapsulated in other hardware devices such as chips.

In some embodiments, the image signal processing module may also be a chip for image signal processing or an electronic device for image signal processing, and other hardware devices or hardware modules including an ISP core and configured for image signal processing.

The present disclosure further provides a computer storage medium storing a computer program, and the computer program, when executed by a processor, can be used to implement the image signal processing driving method described in any of the above embodiments.

From the several embodiments provided by the present disclosure, it is to be understood that the disclosed devices and methods may be implemented in other ways. The device embodiments described above are only schematic. For example, the flowcharts and block diagrams in the accompanying drawings show the architecture, functions and operations of possible implementations of devices, methods and computer program products according to various embodiments of the present disclosure. In this regard, each block in the flowchart or block diagram may represent a module, a program segment or a part of codes, the module, the program segment or the part of codes contains one or more executable instructions for implementing specified logical functions. It should also be noted that in some alternative implementations, the functions noted in the blocks may occur in a different order than those noted in the accompanying drawings. For example, two consecutive blocks may actually be executed substantially in parallel, and may sometimes be executed in the reverse order, depending on the functions involved. It should also be noted that each block in the block diagrams and/or flowcharts, and combinations of blocks in the block diagrams and/or flowcharts may be implemented by a dedicated hardware-based system that performs specified functions or actions, or may be implemented by a combination of dedicated hardware and computer instructions.

In addition, each functional module in each embodiment of the present disclosure may be integrated to form an independent part, or each module may exist alone, or two or more modules may be integrated to form an independent part.

If the functions are implemented in the form of functional modules for software and sold or used as independent products, they may be stored in a computer-readable storage medium. Based on this understanding, the essential part of the technical solutions of the present disclosure or the part of the technical solutions that contributes to the prior art may be embodied in the form of a software product, which is stored in a storage medium and includes a number of instructions to make a computer device (which may be a personal computer, a server, or a network device, etc.) perform all or some of the steps of the methods described in various embodiments of the present disclosure. The aforementioned storage media include: U disk, mobile hard disk, read-only memory (ROM), random access memory (RAM), magnetic disk or optical disk, and other media that can store program codes.

The above are only the embodiments of the present disclosure, and are not intended to limit the scope of protection of the present disclosure. For a person skilled in the art, various modifications and changes may be made to the present disclosure. Any modification, equivalent replacement, improvement, etc. made within the spirit and principles of the present disclosure shall fall within the scope of protection of the present disclosure. It should be noted that similar reference numerals and letters indicate similar items in the accompanying drawings, so once a certain item is defined in one drawing, it does not need to be further defined and described in subsequent drawings.

The above are only specific implementations of the present disclosure, but the scope of protection of the present disclosure is not limited to this. Any person familiar with this technical field can easily conceive changes or substitutions within the technical scope disclosed in the present disclosure, which should fall within the scope of protection of the present disclosure. Therefore, the scope of protection of the present disclosure shall be subject to the scope of protection of the claims.

It should be noted that in the present disclosure, relational terms such as "first" and "second" are only intended to distinguish one entity or operation from another entity or operation, and do not necessarily require or imply that there is any such actual relationship or order between these entities or operations. Moreover, the terms "include", "comprise", "contain" or any other variation thereof are intended to cover non-exclusive inclusion, so that a process, a method, an article or a device including a series of elements includes not only those elements, but also other elements not explicitly listed or elements inherent to such a process, a method, an article or a device. In the absence of further restrictions, an element defined by the statement "including one" does not exclude the existence of other same elements in the process, method, article or device including the element.

What is claimed is:

1. An image signal processing driving method, applicable to an image signal processing module comprising a plurality of ISP cores or an ISP core supporting time division multiplexing, wherein the image signal processing module is equipped with a driver architecture, the driver architecture comprises an interface layer, a connection layer and a driver layer, and the driver layer is connected to the ISP cores or the ISP core; the method comprising:
   receiving, by the interface layer, an image signal processing (ISP) instruction sent by an upper application, wherein the ISP instruction carries initial control parameters and image size parameters;
   determining, by the connection layer, a processing mode of image signals according to the image size parameters, and determining target control parameters according to the initial control parameters for different processing modes, wherein the processing mode comprises a single-core mode or a multi-core mode; and
   sending, by the driver layer, the target control parameters to a target ISP core, so as to drive the target ISP core to perform image signal processing according to the target control parameters.

2. The method according to claim 1, wherein the processing mode is the multi-core mode, and wherein the determining target control parameters according to the initial control parameters comprises:
   constructing a plurality of control parameters as the target control parameters according to the initial control parameters.

3. The method according to claim 2, wherein the ISP instruction comprises a called target function, and the constructing a plurality of control parameters as the target control parameters according to the initial control parameters comprises:
   calling a member function pointed by a function pointer bound to the multi-core mode to construct the initial control parameters into the plurality of control parameters as the target control parameters, wherein the member function corresponds to the target function.

4. The method according to claim 3, wherein the target function comprises one or more of a functional module opening function, a functional module closing function and a driver interface function.

5. The method according to claim 2, wherein the ISP instruction indicates a target image processing function to be implemented; the target control parameters comprise control parameters of size type, the control parameters of size type comprise one or more of image width, parameters related to image width, image height, and parameters related to image height; the target ISP core performs image signal processing to implement the target image processing function; and the constructing a plurality of control parameters as the target control parameters according to the initial control parameters comprises:
   if the target image processing function is a preset function, constructing a plurality of different control parameters as the target control parameters, wherein the preset function is implemented by performing image signal processing in the target ISP core according to the control parameters of size type; and if the target image processing function is not the preset function, constructing a plurality of same control parameters as the target control parameters.

6. The method according to claim 5, wherein the constructing a plurality of different control parameters as the target control parameters comprises:
calculating according to a preset image position to obtain a plurality of different control parameters as the target control parameters.

7. The method according to claim 1, wherein in the multi-core mode, the method further comprises:
in response to having received all interrupt signals of the image signal processing corresponding to the target ISP core, synchronizing, merging and sending, by the connection layer, the all interrupt signals to the interface layer.

8. The method according to claim 7, wherein the method further comprises:
after receiving interrupt signals corresponding to the target ISP core, storing the interrupt signals in a corresponding queue; and
the in response to having received all interrupt signals of the image signal processing corresponding to the target ISP core, synchronizing, merging and sending the all interrupt signals to the interface layer comprises:
when the interrupt signals are stored in all queues, reading the interrupt signals in each queue, then synchronizing, merging and sending to the interface layer.

9. The method according to claim 8, wherein
if a plurality of target ISP cores are provided, the all interrupt signals comprise interrupt signals corresponding to all the target ISP cores, and the corresponding queue is a queue corresponding to a target ISP core sending the interrupt signals; and
if the target ISP core supports time division multiplexing, the all interrupt signals comprise interrupt signals sent by the target ISP core in all multiplexing time periods, and the corresponding queue is a queue corresponding to a multiplexing time period where the interrupt signals are sent.

10. The method according to claim 8, wherein the interrupt signals comprise a plurality of types, and the storing the interrupt signals in a corresponding queue comprises:
according to a target type to which the interrupt signals belong, storing the interrupt signals in a target position corresponding to the target type in the queue; and
all the queues storing the interrupt signals comprises that:
the interrupt signals are stored in target positions of all the queues.

11. The method according to claim 1, wherein the processing mode is the single-core mode, and wherein the determining target control parameters according to the initial control parameters comprises:
determining the initial control parameters to be the target control parameters.

12. An image processing control module, wherein the image processing control module is configured for being connected to a plurality of ISP cores or an ISP core supporting time division multiplexing, and the image processing control module is configured for implementing the steps of the method according to claim 1.

13. An image signal processing module, comprising the image processing control module according to claim 12, and a plurality of ISP cores or an ISP core supporting time division multiplexing, wherein the image processing control module is connected to the plurality of ISP cores or the ISP core supporting time division multiplexing.

14. The image signal processing module according to claim 13, wherein the image signal processing module is an IP core, a chip or an electronic device configured for image signal processing.

15. The method according to claim 3, wherein the ISP instruction indicates a target image processing function to be implemented; the target control parameters comprise control parameters of size type, the control parameters of size type comprise one or more of image width, parameters related to image width, image height, and parameters related to image height; the target ISP core performs image signal processing to implement the target image processing function; and the constructing a plurality of control parameters as the target control parameters according to the initial control parameters comprises:
if the target image processing function is a preset function, constructing a plurality of different control parameters as the target control parameters, wherein the preset function is implemented by performing image signal processing in the target ISP core according to the control parameters of size type; and
if the target image processing function is not the preset function, constructing a plurality of same control parameters as the target control parameters.

16. The method according to claim 4, wherein the ISP instruction indicates a target image processing function to be implemented; the target control parameters comprise control parameters of size type, the control parameters of size type comprise one or more of image width, parameters related to image width, image height, and parameters related to image height; the target ISP core performs image signal processing to implement the target image processing function; and the constructing a plurality of control parameters as the target control parameters according to the initial control parameters comprises:
if the target image processing function is a preset function, constructing a plurality of different control parameters as the target control parameters, wherein the preset function is implemented by performing image signal processing in the target ISP core according to the control parameters of size type; and
if the target image processing function is not the preset function, constructing a plurality of same control parameters as the target control parameters.

* * * * *